United States Patent

[11] 3,585,791

| [72] | Inventor | Stephen L. Batog<br>Moline, Ill. |
|---|---|---|
| [21] | Appl. No. | 805,612 |
| [22] | Filed | Mar. 10, 1969 |
| [45] | Patented | June 22, 1971 |
| [73] | Assignee | J. I. Case Cmpany |

[54] DRAPER PICKUP SERVICE
6 Claims, 4 Drawing Figs.

| [52] | U.S. Cl. | 56/364 |
|---|---|---|
| [51] | Int. Cl. | A01d 43/02 |
| [50] | Field of Search | 56/344, 345, 350, 351, 358, 364, 23, 2, 181—188 |

[56] References Cited
UNITED STATES PATENTS

| 1,152,572 | 9/1915 | Strickland | 56/185 |
|---|---|---|---|
| 2,324,261 | 7/1943 | Krause | 56/364 |
| 2,816,413 | 12/1957 | Worrell | 56/364 |
| 2,881,580 | 4/1959 | Ashton | 56/364 |

*Primary Examiner*—Robert Peshock
*Assistant Examiner*—J. A. Oliff
*Attorney*—Dressler, Goldsmith, Clement and Gordon ABSTRACT: A draper pickup device for picking up windrowed crops and transferring the crops into a cross-conveyor of a crop handling machine, such as a combine, with the pickup device including a hinged wiper plate positioned in crop stripping relationship with respect to the crop pickup fingers on the pickup device.

Inventor:
Stephen L. Balog
By Dressler, Goldsmith
Clement & Gordon
Attys.

Inventor
Stephen L. Balog
By: Dressler, Goldsmith
Clement & Gordon
Attys.

DRAPER PICKUP SERVICE

BACKGROUND OF THE INVENTION

In the past, draper-type pickup devices have been used in crop handling machines, such as combines, for picking up windrowed crops and transferring the crops into the header of the crop handling machine. In the usual machine, the header includes a cross-conveyor in the form of an auger having oppositely pitched flighting at opposite ends thereof for transferring crops discharged by the draper pickup device laterally inwardly toward a centrally disposed elevator opening, where the crops are transferred by an elevating conveyor to a position where they can be acted upon by a threshing cylinder.

It is common to mount draper pickup devices for pivotal movement relative to the header of the associated crop handling machine, to allow the frame of the pickup unit to flex and follow the field contour, so as to consistently pick up crops even in rough terrain. Prior art devices have commonly included a wiper bar fixed to the header of the crop handling machine adjacent the discharge end of the pickup device, with the wiper bar being positioned in crop stripping relationship with respect to the crop pickup fingers of the pickup device. Such prior art wiper bar arrangements have functioned generally satisfactorily in even terrain, but have not been entirely satisfactory in rough terrain.

More particularly, it has been found that when draper pickup devices as described above are operated in rough terrain, the continuously changing angular relationship between the frame of the pickup device and the wiper blade often causes the gap between the upper end of the pickup conveyor and the wiper blade to narrow to such an extent that the pickup fingers are excessively compressed and wear extensively, often breaking. Furthermore, the pickup fingers are often compressed flat against the conveyor so that the wiper blade does not effectively strip crops from the pickup fingers.

SUMMARY OF THE INVENTION

The draper pickup device of the present invention is a novel self-contained unit that obviates the problems mentioned above by providing a hingedly mounted crop stripping plate directly on the frame of the pickup unit in a location that effectively prevents wearing and breakage of the pickup fingers. Furthermore, since the crop wiper means are provided as a part of the draper pickup unit itself (rather than being part of the crop handling machine), the unit may be used with various types of crop handling machines. In accordance with the invention, the wiper plate is arranged to rest in the trough of the cross-conveyor of the crop handling machine, and because of the hinged mounting of the wiper plate, crops will be effectively stripped from the pickup fingers and transferred through a smooth transitional zone to the trough, regardless of the angular orientation of the pickup device relative to the header of the crop handling machine.

BRIEF DESCRIPTION OF THE DRAWINGS

FIG. 4 is a fragmentary side elevational view illustrating the draper pickup structure of the present invention in two positions.

DESCRIPTION OF THE PREFERRED EMBODIMENT

Figure 1:
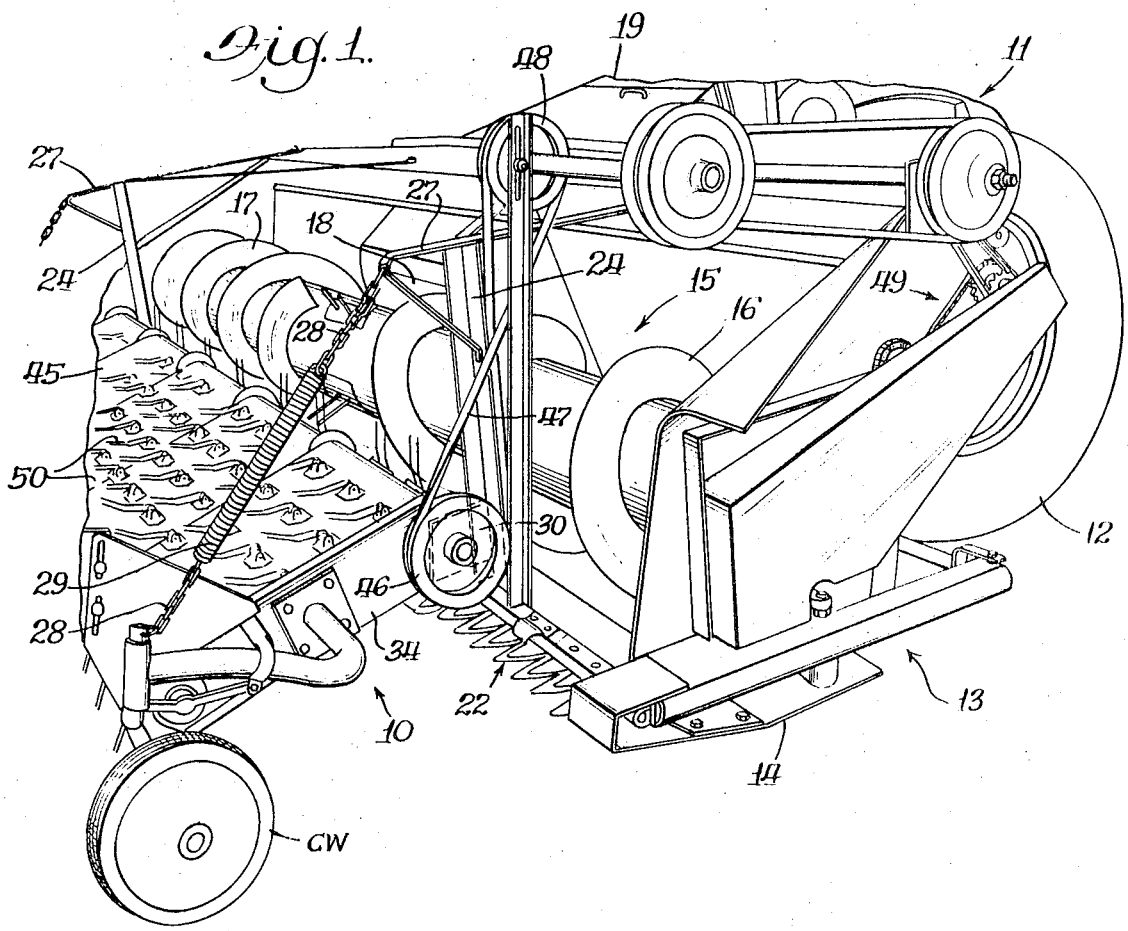
FIG. 1 is a fragmentary perspective view of a crop handling machine including the improved draper pickup device of the present invention.

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

The draper pickup unit of the present invention is illustrated generally at 10 in FIG. 1, and is shown in connection with a crop handling machine 11, such as a combine, that is supported upon ground traversing wheels 12. A header assembly 13 is provided at the forward end of combine 11, and includes a transversely extending trough 14 at at the lower end thereof that is adapted to receive crops picked up and deposited by pickup unit 10. As is conventional, a cross-conveyor in the form of an auger 15 is provided within trough 14, with flighting 16 and 17 at opposite ends of the auger being oppositely pitched to convey crops inwardly toward a central opening 18. An elevator conveyor, not shown, communicates with opening 18 for conveying crops upwardly through a housing 19 to a threshing cylinder, also not shown.

Figure 2:
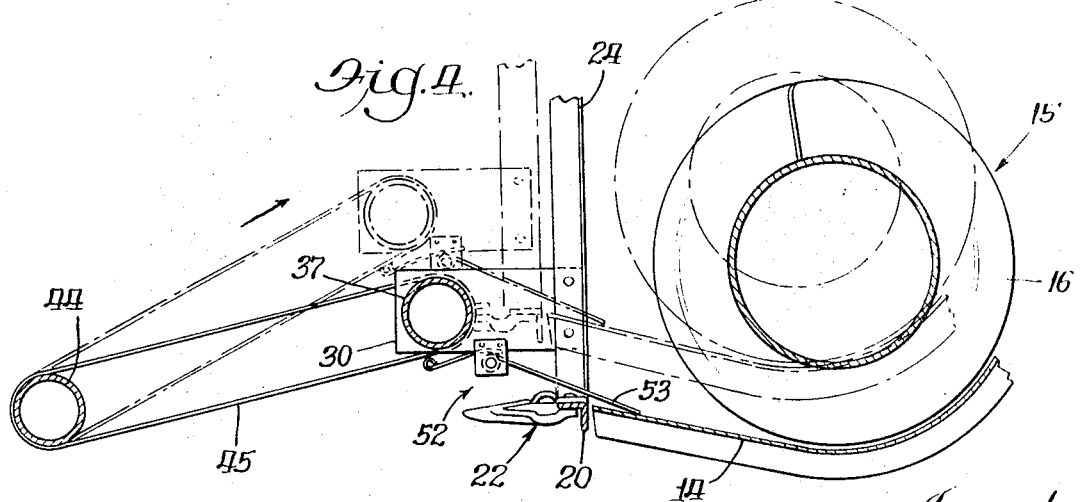
FIG. 2 is an enlarged side elevational view of the improved crop stripping wiper means of the present invention.
Figure 2:
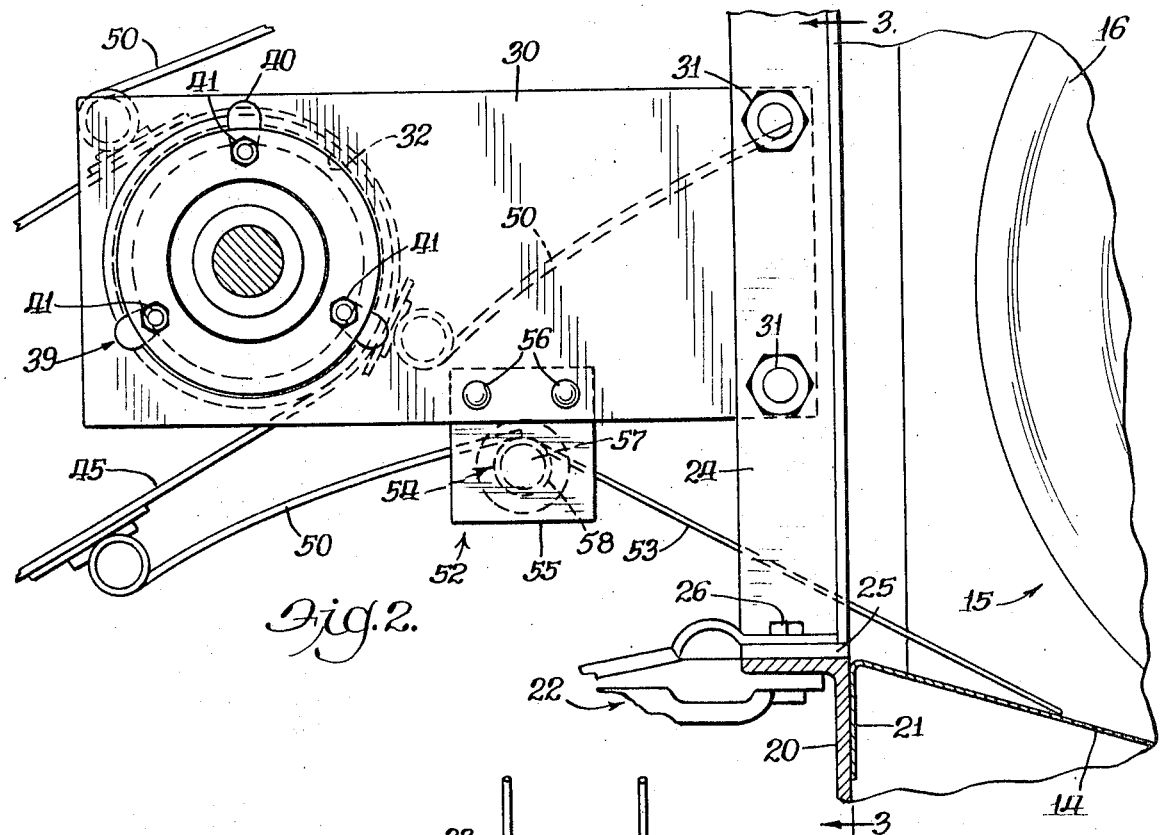
Figure 3:
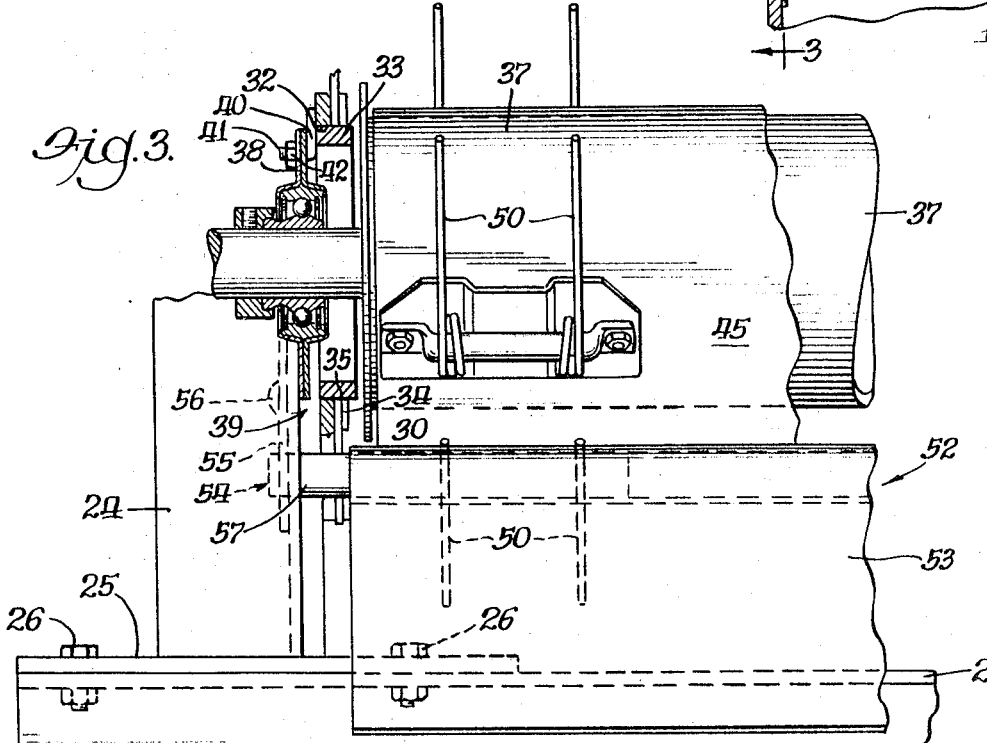
FIG. 3 is an end elevational view taken generally along line 3-3 of FIG. 2.

A transversely extending angle 20 is provided at the forward end of the crop handling machine 11, and a downwardly extending flange of angle 20 is preferably secured to a downwardly extending flange 21 at the forward end of trough 14, as can be best seen in FIG. 2. A cutting mechanism 22, in the form of a conventional sickle bar structure, is secured to the horizontally disposed flange of angle 20, as is well known. Generally vertically disposed mounting angles 24 are secured to generally horizontally disposed platelike feet 25, which are secured by bolts 26 at transversely spaced locations to angle 20. Inclined mounting supports 27 extend outwardly from angles 24 adjacent the upper end thereof, and the draper pickup unit 10 is detachably suspended from the supports 27 by chains 28 and springs 29.

The draper pickup unit 10 is also detachably secured to the header assembly 13 of the crop handling machine 11 by spaced brackets 30 that are secured by bolts 31 to the forwardly extending flange of mounting angle 24. Brackets 30 have transversely aligned circular openings 32 in which a short cylindrical sleeve 33 is fixed, as by welding. Sleeve 33 extend slightly inwardly from brackets 30 to provide journals for pivotally supporting the pickup unit 10, which includes a pair of laterally spaced frame members 34, each having an opening 35 adjacent one end thereof that is impaled by an end of a sleeve 33.

A first or upper roll 37 is rotatably mounted between brackets 30, and to this end, annular bearing plates 38 are secured to the sides of brackets 30 opposite from sleeves 33 by screws 39. As can be best seen in FIG. 2, three screws 39 are provided in the illustrated embodiment of the invention at equally circumferentially spaced positions around opening 32, with screws 39 including a flattened portion 40 secured to bracket 30, as by welding, adjacent opening 32, and with screws 39 further including an externally threaded right angled portion 41. Bearing plates 38 include clearance openings therein that are impaled by screw portion 41, and nuts 42 are threaded onto screw portions 41 to hold the bearing plates 38 against the bracket 30. A lower roll 44 (FIG. 4) is rotatably journaled between the lowermost end of frame members 34, and a transversely elongate beltlike conveyor 45 is trained over rolls 37 and 44. Roll 37 and conveyor 45 is trained over rolls 37 and 44. Roll 37 and conveyor 45 are rotated through a belt drive (FIG. 1), including a pulley 46 and a belt 47 trained thereabout and trained over a further pulley 48 that is rotated from the drive to auger 15 by power takeoff means 49. A plurality of conventional springlike crop pickup fingers 50 are mounted on conveyor 45, and fingers 50 may take the form of those illustrated in Paradise et al. Pat. No. 2,347,926.

The draper pickup device 10 is illustrated as being supported by caster wheels CW, although it will be appreciated that conventional skids may be substituted for the caster wheels when fairly even terrain is to be encountered. In use, as the draper pickup device 10 traverses the ground in alignment with windrowed drops and conveyor 45 is rotated to move the upper flight rearwardly, as indicated by the arrow in FIG. 4, fingers 50 brush the ground and pick up the crops in a known manner. The crops are transported by the conveyor 45 to the upper roll 37, where they are discharged to the trough 14 for transferrence by the auger conveyor 15 to the elevator opening 18. Wiper means 52 is provided in the gap between the upper roll 37 and the trough 14 for stripping crops from the pickup fingers 50 as they move around the upper roll 37.

Wiper means 52 includes a transversely elongate plate 53 that is pivotally connected to support plates 30 by hinge means 54. Hinge means 54 is connected between support brackets 55 that are secured in depending relationship to support plates 30 by fasteners 56. Hinge means 54 includes means defining a journal for wiper plate 53, and to this end, transversely aligned rods 57 are secured to brackets 55 by welding or the like. An arcuate, reversely bent portion 58 is provided at the upper end of the wiper plate 53, and is received over journal rods 57 to mount the wiper plate for pivotal movement relative to brackets 55.

As is evident from FIGS. 2 and 4, journal rods 57 are located a substantial distance downwardly and rearwardly from the rotational axis of upper roll 37, and this arrangement effectively prevents the gap between wiper plate 53 and upper roll 37 from narrowing to such an extent as to cause excessive wear or breakage to the pickup fingers 50, even though the pickup unit 10 assumes a fairly steeply inclined position relative to the crop handling machine 11, as is shown in broken lines in FIG. 4. Furthermore, the transversely elongate wiper plate 53 provides a smooth transitional zone for transferrence to trough 14 of the crops that are stripped from the pickup fingers 50 by wiper plate 53.

What I claim is:

1. A pickup device for attachment to a header of a crop handling machine comprising: support means for attachment to a forward portion of said header; a frame having an upper end and a lower end; means pivotally mounting the upper end of said frame on said support means; upper and lower transversely extending rolls rotatably mounted on said frame adjacent the upper and lower ends thereof, respectively; conveyor means extending around said upper and lower rolls, said conveyor means having an upper flight; crop pickup means on said conveyor means; means for rotating one of said rolls to move said upper flight rearwardly and move said pickup means from a crop pickup position adjacent said lower roll to a crop discharge position adjacent said upper roll; and wiper means carried solely by said support means below and rearwardly of said upper roll and extending rearwardly towards said header for stripping crops from said pickup means as said pickup means move through said discharge position.

2. A pickup device as set forth in claim 1 including hinge means pivotally mounting said wiper means on said support means.

3. A pickup device as set forth in claim 2 wherein said wiper means is defined by a transversely elongated plate.

4. For use with a crop handling machine including a transversely extending auger conveyor rotatably mounted above a trough for transferring crops discharged into said trough to an elevator opening, a pickup device comprising: support means for attachment to a forward portion of said header; a frame having an upper end and a lower end; means pivotally mounting the upper end of said frame on said support means; upper and lower transversely extending rolls rotatably mounted on said frame adjacent the upper and lower ends thereof, respectively; conveyor means extending around said upper and lower rolls; crop pickup means on said conveyor means; means for rotating one of said rolls to move said pickup means from a crop pickup position adjacent said lower roll to a crop discharge position adjacent said upper roll; and wiper means on said support means adjacent said upper roll for stripping crops from said pickup means as said pickup means move through said discharge position, said wiper means including a transversely extending plate hingedly mounted on said support means, the lower end of said plate being adapted to rest upon the trough of said crop handling machine, whereby a smooth crop transitional zone is created regardless of the angular orientation between said frame and said trough.

5. A pickup device as set forth in claim 4 wherein said support means includes means defining a transversely extending journal, and wherein said plate includes an arcuate flange at the upper end thereof hingedly embracing said journal.

6. A pickup device as set forth in claim 5 wherein said journal is located below and rearwardly of said upper roll.

PO-1050
(5/69)

UNITED STATES PATENT OFFICE
CERTIFICATE OF CORRECTION

Patent No. 3,585,791        Dated June 22, 1971

Inventor(s) Stephen L. Batog

It is certified that error appears in the above-identified patent and that said Letters Patent are hereby corrected as shown below:

Column 2, line 10, delete "at" which appears immediately after the number "14".

Column 2, line 39, "Sleeve 33" should read -- Sleeves 33 --.

Column 2, lines 61 and 62, delete "is trained over rolls 37 and 44. Roll 37 and conveyor 45".

Column 3, line 16, "of the wiper plate" should read -- of wiper plate --.

Signed and sealed this 18th day of January 1972.

(SEAL)
Attest:

EDWARD M. FLETCHER, JR.
Attesting Officer

ROBERT GOTTSCHALK
Acting Commissioner of Patents